United States Patent Office 3,379,830
Patented Apr. 23, 1968

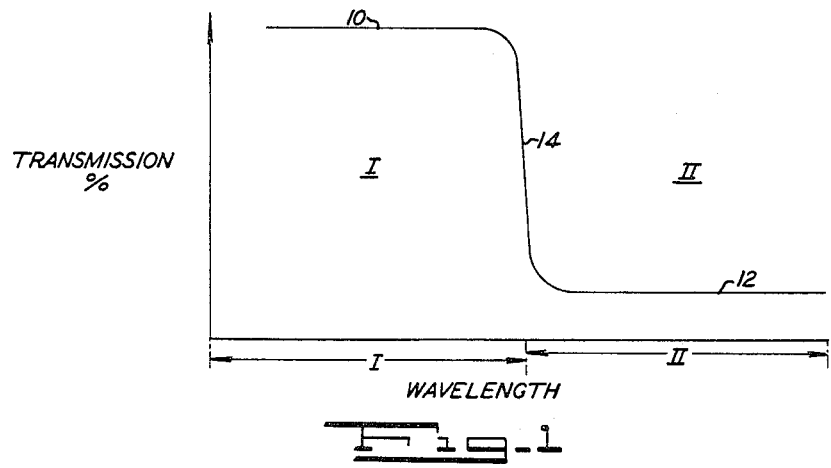
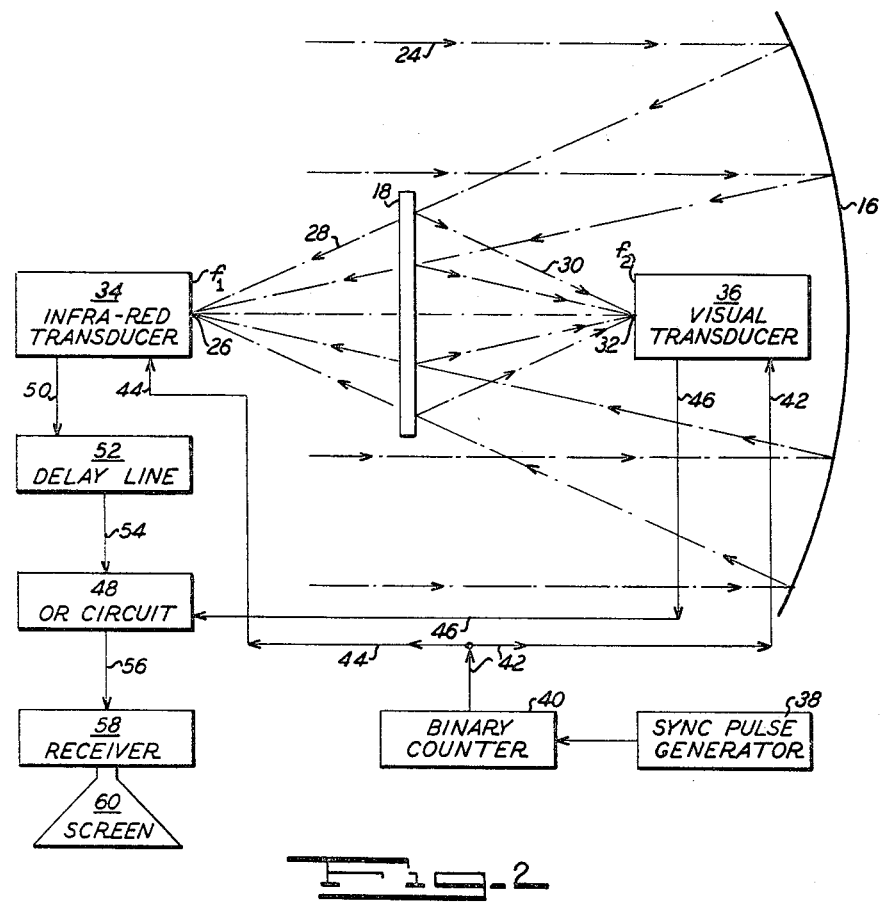

3,379,830
DECAMOUFLAGING APPARATUS BY SEQUENTIAL OVERLAY OF DIFFERENT SPECTRAL PICTURES OF A SINGLE RADIATING BODY
Joseph F. Menke, Heidelberg, Germany, assignor to Eltro G.m.b.H. & Co., Heidelberg, Germany
Continuation-in-part of application Ser. No. 69,765, Nov. 16, 1960. This application May 4, 1964, Ser. No. 365,239
Claims priority, application Germany, Nov. 16, 1959
1 Claim. (Cl. 178—6.8)

ABSTRACT OF THE DISCLOSURE

A camouflage device is provided which optically divides a view into two spectral parts which are alternately projected on a screen.

---

This application is a continuation-in-part of Ser. No. 69,765 filed Nov. 16, 1960 and now abandoned.

The invention relates to optical apparatus and methods for processing images.

It is an object of the invention to provide improved techniques for processing images whereby the latter are separated into separate images of different spectral ranges.

It is a further object of the invention to provide improved arrangements for displaying images in different forms.

Still another object of the invention is to provide techniques for overcoming camouflage.

Briefly, to achieve the above and other of its objectives, the invention contemplates the interception of an optical image and the reflecting of a portion thereof according to the wavelength of this portion. The remainder of the image is permitted to continue along its optical path, thus producing two separate images, which can be used in various ways, as will be indicated.

The invention will be more fully described with reference to the accompanying drawing, in which:

FIG. 1 is a graph illustrating an optical phenomenon employed in accordance with the invention;

FIG. 2 illustrates diagrammatically an optical and electronic system which constitutes a preferred embodiment of the invention;

Figure 3:
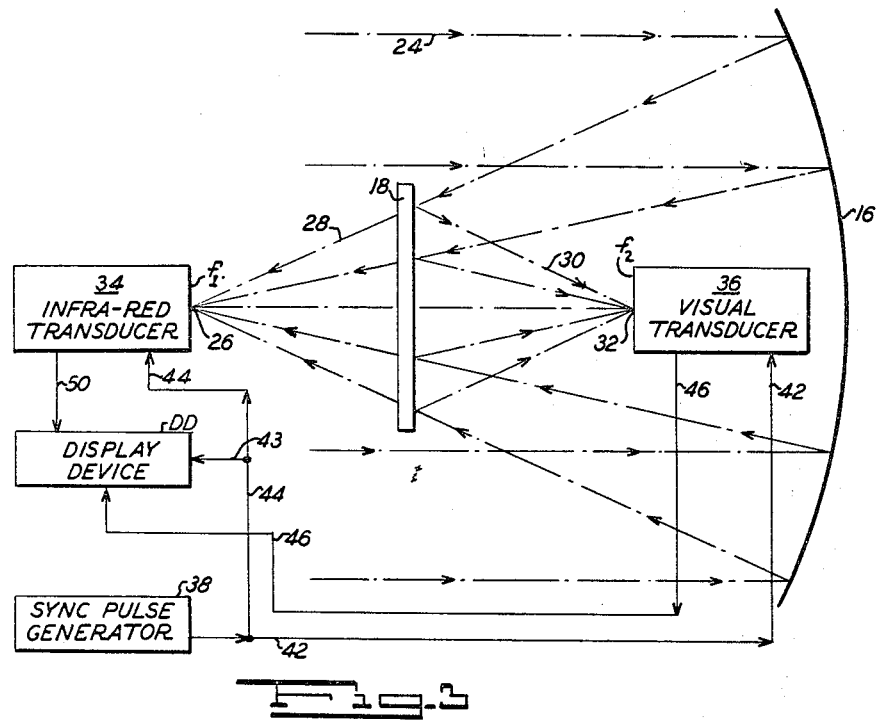
FIG. 3 is a block diagram of a system operative with different spectral ranges which includes a display device.

The process and apparatus provided in accordance with the invention differ from previously known concepts in that two separate pictures or images are obtained. Thus, for example, an image is separated according to the invention into blue and red images, ultra-violet and visible images, visible and infra-red images and near infra-red and far infra-red images, and the like.

According to the invention there is employed a semipermeable mirror having excellent transmission characteristics in one spectral range and higher reflection characteristics in the other spectral range.

This phenomenon is indicated by the graph of FIG. 1, wherein the horizontal ordinate represents wavelengths, whereas the vertical ordinate represents transmission percentage, the remaining percentage being reflected by the mirror for which the curve is presented.

In the graph the wavelength range is illustrated as being divided into two sub-ranges I and II. The curve consists of portions 10 and 12 connected by a portion of sharp slope 14.

From this curve it can be seen that the wavelengths of an image which lie in range I are to a great extent transmitted through the said mirror, whereas the wavelengths lying in range II are reflected.

In FIG. 2 is illustrated the apparatus making use of the above-noted characteristics. This apparatus includes a concave mirror 16 and a semipermeable mirror 18.

The function of mirror 16 is to receive rays 24, which are parallel, and to reflect and converge the rays towards a focal point 26, the rays following an optical path whereby they either pass through or are reflected by the semipermeable mirror 18, as indicated by rays 28 and 30 respectively. The rays passing through converge at focal point 26 in focal plane $f_1$, the reflected rays converge at focal point 32 in focal plane $f_2$.

The semipermeable mirror 18 is of a commercially available type known as a multilayer interference filter and is transparent for long wavelengths and reflects wavelengths below a predetermined limit. These mirrors are conventionally provided by metallizing techniques which are known and form no part of this invention. The production of partially transparent mirrors which as a consequence of selective "silvering" pass the radiation of one range of wave lengths, e.g. infra-red radiation, and reflect that of the other, e.g. visible radiation, are described in many publications. For example:

(1) Foto-Kino-Technik, Number 8 (1949) "Cold Light and Interference Filters" at col. 3, page 187, describes an infra-red transparent mirror;

(2) German Patent No. 1,055,474 published Apr. 23, 1959 describes a so-called "cold light mirror" provided with interference layers for passing heat waves (infra-red radiation) or absorbing them and reflecting light waves (visible radiation).

It will be assumed that mirror 18 reflects visual energy and transmits infra-red energy.

Accordingly, the total radiation from an object is divided into two wave ranges by semipermeable mirror 18, which reflects the radiation of one range and passes without substantial attenuation the radiation of the other range. This establishes optical discrimination between transmission and reflection with minimal absorption.

The reflected and transmitted rays are both focused, thereby producing simultaneously two images of the object, one in each image plane at $f_1$ and $f_2$ of FIG. 2. Various useful parameters of the object e.g. size, nature or composition, temperature etc., can be determined from these two images illustrative of the object in two different wavelength ranges.

For example, an object, its background and environment reflect or emit through the visible to the infra-red range when irradiated by the sun or some other source. The total radiation incident on the optical system is collected by concave mirror 16 and reflected onto a partly transparent counter mirror, semipermeable mirror 18, which reflects visible light of less than $0.8\mu$ onto the focal plane at $f_2$ and passes the infra-red rays of more than $0.8\mu$ onto the focal plane at $f_1$.

The focal planes at $f_1$ and $f_2$ perpendicular to the optical axis are also the image planes in which two real images are produced. The plane at $f_2$ contains a visual transducer 36 i.e. camera tube for visible light e.g. a vidicon, and orthicon or an iconoscope. The plane at $f_1$ contains an infra-red transducer 34 i.e. a tube sensitive to infra-red radiation e.g. infra-red resistron. An infra-red resistron is a camera tube with a photolayer sensitive to infra-red radiation, e.g. lead or cadmium sulphide, in which the resistance variations of the internal photo effect caused by illumination are determined by an exploring electron beam and converted into output signals in known manner.

If the object to be observed is matched in appearance to its environment or background, it is camouflaged in the visible spectrum. This means that for a given sensitivity of the photolayer of a camera tube in the visible spectrum the total integral $A'$ of the intensity of radiation emitted by the object throughout the wave range does not differ in its effect on the photolayer from the total integral $A''$ of the intensity of radiation emitted by the environment or background:

$$A' = A''$$

With the arrangement of the invention the total radiation is divided into two wave ranges, for example into infra-red range index 1 and visible range index 2, so that the following result is obtained:

(a) As a consequence of differential reflection of the infra-red from camouflage and natural environment, e.g. foliage (chlorophyll effect), the partial integral $T_1'$ of the intensity of the radiation emitted by the object in the infra-red range (from about $\lambda = 0.8\mu$ up to the limit of sensitivity of the infra-red resistron to the infra-red) differs materially in its effect on the photolayer of the infra-red resistron from the part integral $T_1''$ of the intensity of the radiation emitted by the environment or background:

$$T_1' < T_1'' \text{ or } T_1' > T_1''$$

(b) For a given sensitivity of the visual transducer with respect to the radiation in the visible range (from about 0.4 to $0.8\mu$) the part integrals $T_2'$ and $T_2''$, corresponding to the total integrals $A' = A''$, of the intensities throughout the visible range are also equal in their effect on the photolayer, or $$T_2' = T_2''$$

This means that in accordance with (a) the infra-red image recorded in the infra-red range and displayed in a viewing device clearly identifies the object, because it is outlined on the screen of a viewing device by distinguishable brightness relatively to the environment or background, while in accordance with (b) the normally visible image recorded in the visible range and displayed on the viewing device contains no exploitable features and can serve only as a comparison or reference image.

Thus if the two images recorded in the two different ranges are displayed alternately in rapid sequence on the screen of a same viewing device, the observer experiences a periodical variation or modulation of the brightness, with the maximum modulation occurring at the contour of the image corresponding to the outlines of the object, whereby the latter appears somewhat darker than its environment or background.

The system of FIGURE 2 accomplishes this result.

This system includes a conventional sync pulse generator 38 which transmits periodically occurring pulses to conventional binary counter 40. The output of binary counter 40 is connected via line 42 to the frame sync input of visual transducer 36 and via line 44 to the frame sync input of infra-red transducer 34. Accordingly, every other pulse of sync pulse generator 38 simultaneously triggers the frame sweeps of the transducers 34 and 36. Both transducers 34 and 36 then simultaneously transmit signals representing the scanned images of the object. Visual transducer 36 transmits its signals directly via line 46 to one input of conventional "or" circuit 48. The signals from infra-red transducer 34 are transmitted via line 50, conventional delay line 52 and line 54 to the other input of "or" circuit 48. The delay introduced by delay line 52 is equal to the period of the sync pulses. Accordingly, "or" circuit 48 alternately transmits via line 56 to receiver 58 (a conventional television receiver) the frames of signals from transducers 34 and 36. It should be noted that each pair of frame signals one from each transducer represent the appearance of the object at the same instance of time. Viewing screen 60 of receiver 58 displays the images alternately but because of visual persistance the above described modulation of brightness is obtained.

Figure 4:
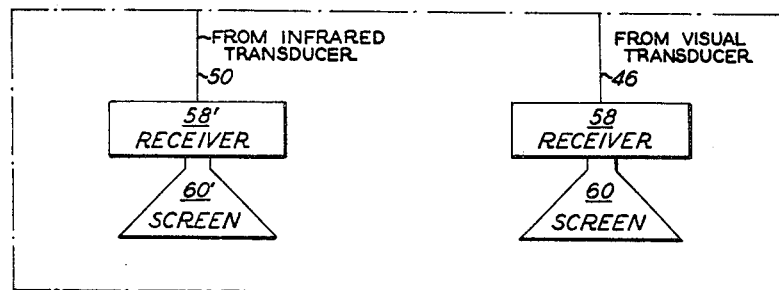
FIG. 4 is one embodiment of the display device of FIG. 3.

The system of FIG. 3 using the display device DD of FIG. 4 accomplishes the same result. Since many portions of the system are the same, like reference characters are employed for like elements and only the differences will be described. Each sync pulse from sync pulse generator 38 simultaneously triggers the transducers 34 and 36. Both transducers transmit their signals via lines 46 and 50 respectively to electronic switch 48' (of conventional design). Switch 48' alternately gates a frame at a time under control of sync pulses received on line 43 the signals from the transducers 34 and 36 to receiver 58 via line 56. Accordingly, screen 60 alternately displays the images received by transducers 34 and 36. It should be noted in this case that the images displayed are of the object at different times.

The system can also be used for piercing the camouflage of objects which have been camouflaged against near infra-red (0.8 to $1.2\mu$), the total incident radiation can be directed onto semipermeable mirror 18 which reflects the energy below $1.2\mu$ for visible and shortwave infra-red ranges and passes that over $1.2\mu$ for longwave infra-red, thermal energy, whereby both ranges can be separately exploited.

Such an arrangement is necessary if the reflectivity of the camouflage material is matched to foliage green. In this event the part integral of the intensity of radiation emitted by the object in the range of near infra-red, $\lambda = 0.8$ to $1.2\mu$, does not differ from the part integral of the intensity of the radiation emitted by the environment or background in that range.

Figure 5:
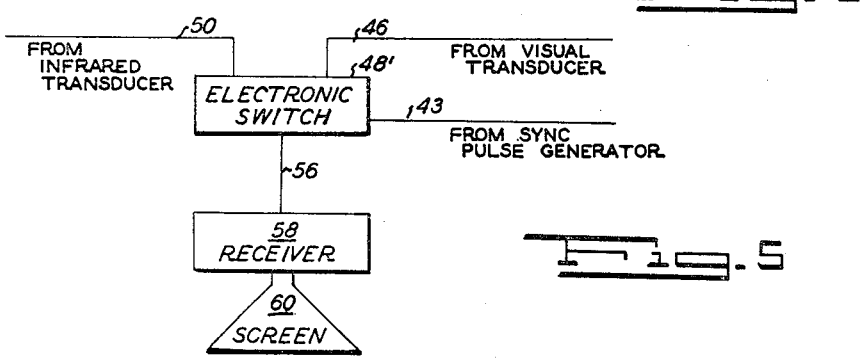
FIG. 5 is another embodiment of the display device of FIG. 3.

The radiation in the range $\leq 1.2\mu$ reflected by the semipermeable mirror 18 and focused at $f_2$ can be recorded by visual transducer 36 with a photolayer having normal sensitivity in the visible range and displayed on a viewing device as the normal image of the object. The radiation in the range over $1.2\mu$ which passes semipermeable mirror 18 is recorded in the plane of $f_1$ by infra-red transducer 34 sensitive in the range of 1.2 to $13\mu$ to produce signals representing a thermal image of the object on the basis of which the distance of the object can be determined by reason of the different respective temperatures of object and background, particularly when continuously compared with the normal image. The system of FIG. 3 using the display device of FIG. 5 is employed for this variation of the invention. Since the major portion of the system has the same components as the above described systems the same reference characters are used for like elements and only the differences will be described.

In particular, sync pulse generator 38 feeds pulses for triggering the frame sync of each of the transducers 34 and 36 via lines 44 and 42 respectively. In response thereto transducers 34 and 36 transmit their image representing signals via lines 50 and 46 respectively to receivers 58 and 58' respectively for simultaneous display by screens 60 and 60'. Thus the visual and infra-red or thermal images can be simultaneously viewed for differences which will be present if the object is camouflaged.

The systems were explained by way of example for visible and infra-red images but may, of course, be analogously modified for the separation of ultra-violet and visible, as well as for the subdivision of a spectral range, such as visible colors, near infra-red and far infra-red, etc. If for example, a visible image is to be separated into blue and red, this can be effected by the suitable selection of a semipermeable mirror, in which case the transducers used would be capable of receiving both spectral ranges. It is possible to use two different infra-red resistrons (one for shorter waves and one for longer waves) for the transducers. If still longer wave ranges are desired, it will be necessary to use receiving instruments consisting of a multiplicity of photo-cells for a long-wave spectral range (the cells being of PbS, PbT, PbSe uncooled and cooled, Se, Ge, as well as the semiconductor substances known as III–V compounds). The signal evaluation of these multiple cells is effected with conventional scanning and image-forming techniques which are used for so-called "heat-image" devices. Receiving sets for the ultra-violet range can be analogously provided.

It is to be understood that the technique of the invention is also susceptible of application for separating narrow bands from an overall spectrum. It will also be understood that the invention finds application wherever an object or image is to be observed in different spectral positions, either simultaneously or successively.

There will now be obvious to those skilled in the art many modifications and variations of the method and apparatus set forth above. These modifications and variations will not, however, depart from the scope of the invention if defined by the following claim.

What is claimed is:

1. Apparatus for simultaneously producing two images of an object and a background emitting together radiant energy in two different wavelength ranges, said apparatus comprising:
   (a) an optical system including
     (1) a focusing device receiving the total radiant energy emitted by the object and said background in a given direction, and
     (2) a partly transparent mirror positioned in the path of energy from the focusing device to the focal point thereof for passing a portion of said energy in one wavelength range to said focal point and reflecting the remaining energy in the other wavelength range to the point of optical symmetry of said focal point with respect to said mirror, and
   (b) an electronic system including
     (1) transducers in the image planes at said focal point and at said point of optical symmetry for converting into electrical signals the optical images of said object in said planes, the transducers comprising camera tubes sensitive to the respective wavelength range,
     (2) sync pulse generating means for transmitting sync pulses to each of said camera tubes,
     (3) means for delaying the signals from one of said transducers one sync pulse period, and
     (4) means for receiving the signals directly from the other of said transducers and the delayed signals from said one transducer and converting said signals to an intensity modulated single image.

References Cited

UNITED STATES PATENTS

| | | | |
|---|---|---|---|
| 706,297 | 8/1902 | De Bruyn | 88—14 |
| 2,313,224 | 3/1943 | Cawein | 178—5.4 |
| 2,460,350 | 2/1949 | Hinman | 88—14 |
| 2,561,612 | 7/1951 | Culver | 88—14 |
| 2,753,395 | 7/1956 | Lawrence | 178—6 |
| 2,697,742 | 12/1954 | Evans | 178—5.4 |
| 3,054,998 | 9/1962 | Cooper | 343—5 |
| 3,025,515 | 3/1962 | Fairbanks | 343—6 |
| 3,076,961 | 2/1963 | Bibbero | 178—6.8 X |
| 3,250,174 | 5/1966 | Lutz | 250—86 |

ROBERT L. GRIFFIN, *Primary Examiner.*

RODNEY D. BENNETT, CHESTER L. JUSTUS,
*Examiners.*

J. A. ORSINO, G. M. FISHER, D. C. KAUFMAN,
*Assistant Examiners.*